United States Patent
Lyu et al.

(10) Patent No.: US 11,937,232 B2
(45) Date of Patent: Mar. 19, 2024

(54) METHOD AND DEVICE FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/475,082

(22) Filed: Sep. 26, 2023

(65) Prior Publication Data
US 2024/0015731 A1    Jan. 11, 2024

Related U.S. Application Data

(63) Continuation of application No. PCT/CN2022/091096, filed on May 6, 2022.

(51) Int. Cl.
*H04W 72/1263* (2023.01)
*H04W 72/115* (2023.01)
*H04W 72/23* (2023.01)

(52) U.S. Cl.
CPC ...... *H04W 72/1263* (2013.01); *H04W 72/115* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 2021/0410180 A1 | 12/2021 | Tsai et al. | |
| 2023/0164773 A1* | 5/2023 | Alfarhan | H04W 72/52 370/329 |
| 2023/0189349 A1* | 6/2023 | Lin | H04W 74/0833 370/329 |
| 2023/0217499 A1* | 7/2023 | Jeon | H04W 76/30 |
| 2023/0254932 A1* | 8/2023 | Yi | H04L 1/188 370/329 |

FOREIGN PATENT DOCUMENTS

| | | |
|---|---|---|
| CN | 109792782 | 5/2019 |
| CN | 111181693 | 5/2020 |
| CN | 113574952 | 10/2021 |
| CN | 113973377 | 1/2022 |
| WO | WO 2022086410 | 4/2022 |

OTHER PUBLICATIONS

International Search Report and Written Opinion in International Appln. No. PCT/CN2022/091096, dated Nov. 7, 2022, 17 pages (with English machine translation).

* cited by examiner

*Primary Examiner* — Jutai Kao
(74) *Attorney, Agent, or Firm* — Fish & Richardson P.C.

(57) ABSTRACT

A method and a device for wireless communication are provided. The method includes: a terminal device receiving first information sent by a network device, where the first information indicates a first timer, and the first timer has a first duration of performing small data transmission (SDT) using a first transmission resource, where the first duration is shorter than a second duration of a second timer, and the second duration is a duration related to a of SDT performed by the terminal device.

14 Claims, 5 Drawing Sheets

METHOD AND DEVICE FOR WIRELESS COMMUNICATION

CROSS REFERENCE TO RELATED APPLICATIONS

The present application is a continuation of PCT Patent Application No. PCT/CN2022/091096, entitled "METHOD AND DEVICE FOR WIRELESS COMMUNICATION," filed May 6, 2022, the disclosure of which is hereby incorporated by reference in its entirety.

TECHNICAL FIELD

The present application relates to the technical field of communication, and in particular to a method and a device for wireless communication.

BACKGROUND

In order to save signaling overhead of a terminal device, the terminal device is allowed to perform small data transmission (SDT) in the radio resource control inactive (RRC_INACTIVE) state in a communication system. However, there is currently no clear way for terminal devices to ensure data transmission and avoid resource waste as much as possible during SDT.

SUMMARY

In view of the above problems, a method and a device for wireless communication are provided according to embodiments of the present disclosure. Various aspects involved in the embodiments of the present disclosure are described below.

In a first aspect, a method for wireless communication is provided, including: receiving, at a terminal device, first information sent by a network device, the first information being configured to indicate a first timer, and the first timer being configured to indicate duration of performing SDT using a first transmission resource, a duration of the first timer being shorter than a duration of a second timer, and the second timer being configured to indicate duration of SDT performed by the terminal device.

In a second aspect, a method for wireless communication is provided, including: sending, at a network device, first information to a terminal device, the first information being configured to indicate a first timer, and the first timer being configured to indicate duration of performing SDT using a first transmission resource, a duration of the first timer being shorter than a duration of the second timer, and the second timer being configured to indicate duration of SDT performed by the terminal device.

In a third aspect, a terminal device is provided, including: a receiving unit configured to receive first information sent by a network device, the first information being configured to indicate a first timer, and the first timer being configured to indicate duration of performing SDT using a first transmission resource, duration of the first timer being shorter than duration of a second timer, and the second timer being configured to indicate duration of SDT performed by the terminal device.

In a fourth aspect, a network device is provided, including: a sending unit configured to send first information to a terminal device, the first information being configured to indicate a first timer, and the first timer being configured to indicate duration of performing SDT using a first transmission resource, duration of the first timer being shorter than duration of a second timer, and the second timer being configured to indicate the duration of SDT performed by the terminal device.

In a fifth aspect, a terminal device is provided, including: a processor, a memory and a communication interface, the memory being configured to store one or more computer programs, and the processor being configured to call the one or more computer programs in the memory to cause the terminal device to implement the method described in the first aspect.

In a sixth aspect, a network device is provided, including: a processor, a memory and a communication interface, the memory being configured to store one or more computer programs, and the processor being configured to call the one or more computer programs in the memory to cause the network device to implement the method described in the second aspect.

In a seventh aspect, a device is provided, including a processor configured to call a program from a memory to implement the method described in the first aspect.

In an eighth aspect, a device is provided, including a processor configured to call a program from a memory to implement the method described in the second aspect.

In a ninth aspect, a chip is provided, including a processor configured to call a program from a memory, to cause a device installed with the chip to implement the method described in the first aspect.

In a tenth aspect, a chip is provided, including a processor configured to call a program from a memory, to cause a device installed with the chip to implement the method described in the second aspect.

In an eleventh aspect, a computer readable storage medium is provided, on which a program is stored, the program causing a computer to implement the method described in the first aspect.

In a twelfth aspect, a computer readable storage medium is provided, on which a program is stored, the program causing a computer to implement the method described in the second aspect.

In a thirteenth aspect, a computer program product is provided, including a program that causes a computer to perform the method described in the first aspect.

In a fourteenth aspect, a computer program product is provided, including a program that causes a computer to perform the method described in the second aspect.

In a fifteenth aspect, a computer program is provided and causes a computer to implement the method of the first aspect.

In a sixteenth aspect, a computer program is provided and causes a computer to implement the method of the second aspect.

In the embodiments of the present disclosure, by setting duration of a terminal device using dedicated resources (such as the first transmission resource), the terminal device only uses the first transmission resource to perform SDT for part of the time. At other times, the terminal device can, for example, use share resources to perform SDT, so as to ensure the data transmission of the terminal device and avoid the waste of resources to a certain extent.

DETAILED DESCRIPTION OF THE EMBODIMENTS

Hereinafter, the technical solution in this disclosure is described with reference to the drawings.

Figure 1:
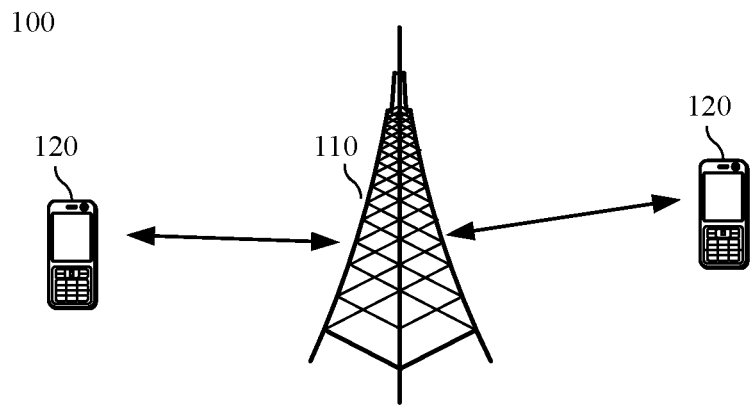
FIG. 1 is an example system architecture diagram of a communication system applicable to an embodiment of the present disclosure.

FIG. 1 is a wireless communication system 100 applied in an embodiment of the present disclosure. The wireless communication system 100 may include a network device 110 and terminal devices 120. The network device 110 may be a device that communicates with the terminal devices 120. The network device 110 may provide communication coverage for a specific geographical area and may communicate with the terminal devices 120 located in the coverage area.

FIG. 1 schematically shows one network device and two terminal devices. In an embodiment, the wireless communication system 100 may include multiple network devices and each network device may include other numbers of terminal devices within its coverage range, which is not limited by the embodiment of this disclosure.

In an embodiment, the wireless communication system 100 may further include other network entities such as a network controller and a mobility management entity, which is not limited by the embodiment of the present disclosure.

It should be understood that the technical solution of the embodiment of the present disclosure may be applied to various communication systems, such as the 5th generation (5G) system or new radio (NR), long term evolution (LTE) system, frequency division duplex (FDD) system, time division duplex (TDD) system, etc. The technical solution provided by the present disclosure may also be applied to future communication systems, such as the sixth generation mobile communication system, and satellite communication system, etc.

The terminal device in the embodiments of the present disclosure may also be called user equipment (UE), access terminal, user unit, user station, mobile station (MS), mobile Terminal (MT), remote station, remote terminal, mobile device, user terminal, terminal, wireless communication device, user agent or user device. The terminal device in the embodiment of the present disclosure may be a device that provides voice and/or data connectivity to users, and may be used to connect people, things and machines, such as handheld devices with wireless connection function, vehicle-mounted devices and the like. The terminal device in the embodiment of the present disclosure may be a mobile phone, a tablet computer (Pad), a notebook computer, a palmtop computer, a mobile internet device (MID), a wearable device, a virtual reality (VR) device, an augmented reality (AR) device, wireless terminals in industrial control, wireless terminals in self driving, wireless terminals in remote medical surgery, wireless terminals in smart grid, wireless terminals in transportation safety, wireless terminals in smart city, wireless terminals in smart home, etc. In an embodiment, the UE may be used to act as a base station. For example, a UE may act as a scheduling entity that provides a lateral link signal between UEs in vehicle-to-everything (V2X) or Device-to-Device (D2D), etc. For example, a cellular phone and a car communicate with each other using lateral link signals. The communication between the cellular phone and the smart home device is through the lateral link signals, without relaying communication signals through the base station.

The network device in the embodiments of the present disclosure may be a device for communicating with a terminal device. The network device may also be called an access network device or a wireless access network device, for example, the network device may be a base station. The network device in the embodiments of the present disclosure may refer to a radio access network (RAN) node (or device) that connects a terminal device to a wireless network. The base station may broadly cover or replace the following names, such as Node B (NodeB), evolved NodeB (eNB), next generation base station (next generation NodeB, gNB), Relay Station, Access Point, transmitting and receiving point (TRP), a transmitting point (TP), a main station (MeNB), an auxiliary station (SeNB), a multi-standard wireless (MSR) node, a home base station, a network controller, an access node, a wireless node, an access piont (AP), a transmission node, a transceiver node, a base band unit (BBU), radio Remote Radio Unit (RRU), active antenna unit (AAU), remote radio head (RRH), central unit (CU), distributed unit (DU), positioning node, etc. The base station may be a macro base station, a micro base station, a relay node, a donor node, or similar, or a combination thereof. The base station may also refer to a communication module, a modem or a chip used to be arranged in the aforementioned devices or apparatuses. The base station may also be a mobile switching center, as well as devices that assume the functions of the base station in device-to-device (D2D), vehicle-to-everything (V2X) and machine-to-machine (M2M) communication, network side devices in 6G networks, devices responsible for base station functions in future communication systems, etc. The base station may support networks with the same or different access technologies. The embodiments of the present disclosure do not limit the specific technology and the specific device form adopted by the network device.

The base station may be fixed or mobile. For example, a helicopter or drone may be configured to act as a mobile base station, and one or more cells may move according to the location of the mobile base station. In other examples, a helicopter or drone may be configured to be configured as a device for communicating with another base station.

In some deployments, the network device in the embodiments of the present disclosure may refer to CU or DU, or the network device includes CU and DU. gNB may also include AAU.

Network devices and terminal devices may be deployed on land, including indoor or outdoor, handheld or vehicular; they may also be deployed on the water surface; they may also be deployed on airplanes, balloons, and satellites in the air. In the embodiments of the present disclosure, there is no limitation to the scene where the network device and the terminal device are located.

It should be understood that the communication device involved in the present disclosure may be a network device or a terminal device. For example, the first communication device is a network device and the second communication device is a terminal device. Another example is that the first communication device is a terminal device and the second communication device is a network device. As another example, the first communication device and the second communication device are both network devices or both terminal devices.

It should also be understood that all or part of the functions of the communication device in the present disclosure may also be realized by software functions running on hardware, or by virtualization functions instantiated on a platform (such as a cloud platform).

At present, three radio resource control (RRC) states of a terminal device are defined in the 3rd Generation Partnership Project (3GPP) protocol: RRC_CONNECTED state, RRC_IDLE state and RRC_INACTIVE state.

The RRC_CONNECTED state may refer to a state in which the terminal device is not released after completing the random access procedure. There is an RRC connection between the terminal device and the network device (such as an access network device). In the RRC_CONNECTED state, data may be transmitted between the terminal device and the network device, such as downlink data transmission and/or uplink data transmission. Alternatively, the terminal device and the network device can also transmit data of a specific data channel and/or control channel of the terminal device to transmit specific information or unicast information of the terminal device.

The RRC_IDLE state refers to a state in which the terminal device resides in the cell, but does not perform random access. The terminal device usually enters the RRC_IDLE state after being turned on or after RRC release. In the RRC_IDLE state, there is no RRC connection between the terminal device and the network device (such as the resident network device). The network device does not store the context of the terminal device, and there is no connection established between the network device and the core network for the terminal device. If the terminal device needs to enter the RRC_CONNECTED state from the RRC_IDLE state, it needs to initiate a RRC connection establishment process.

The RRC_INACTIVE state is a newly introduced state from the perspective of energy saving in order to reduce air interface signaling, quickly restore wireless connection and quickly restore data services. The RRC_INACTIVE state is a state between the connected state and the idle state. The terminal device has entered the RRC_CONNECTED state before, and then released the RRC connection, radio bearer and radio resources with the network device, but the network device saved the context of the terminal device in order to quickly restore the RRC connection. In addition, the connection established between the network device and the core network for the terminal device has not been released, that is, the user plane bearer and the control plane bearer between the RAN and the CN are still maintained, that is, there is a CN-NR connection.

The terminal device may switch between the above three RRC states. For example, the terminal device may suspend its session by entering the RRC_INACTIVE state from the RRC_CONNECTED state when there is no data transmission for a period of time, and may enter the RRC_CONNECTED state from the RRC_INACTIVE state when there is a demand for session transmission. In addition, the terminal device may also enter the RRC_IDLE state from the RRC_INACTIVE state or the RRC_CONNECTED state.

Figure 2:
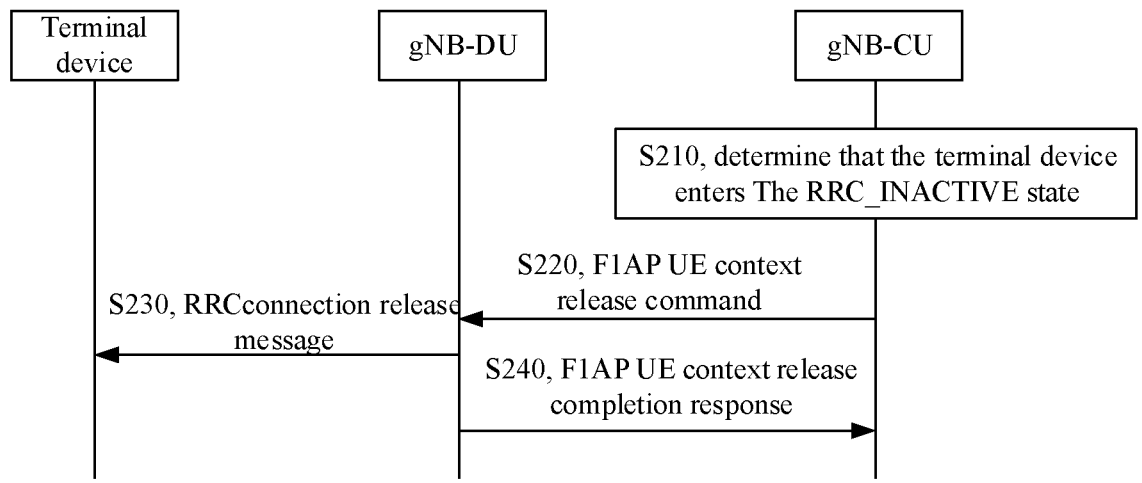
FIG. 2 is a schematic flowchart of a terminal device switching from RRC_CONNECTED state to RRC_INACTIVE state.

Referring to FIG. 2, the process of switching from the RRC_CONNECTED state to the RRC_INACTIVE state is described below.

As shown in FIG. 2, in S210, gNB-CU determines that the terminal device enters the RRC_INACTIVE state.

In S220, gNB-CU may send a F1 Application Protocol (F1AP) UE context release command to gNB-DU.

In S230, gNB-DU sends an RRC connection release message to UE. After receiving the RRC connection release message, the UE may release the RRC connection with gNB and enter the RRC_INACTIVE state.

In S240, gNB-DU sends a response indicating that the F1AP UE context release is completed to gNB-CU.

For a terminal device with infrequent data transmission, the terminal device may remain in the RRC_INACTIVE state to save power. Before the 3GPP release 16 (Rel-16), a terminal device in the RRC_INACTIVE state do not support data transmission, that is, the transmission of mobile original (MO) data and mobile terminated (MT) data is not supported. The MO data refers to a sending end of the data being the terminal device, and the message is transmitted from the terminal device to the network device. MO data may also be referred to as uplink data. The MT data refers to the sending end of the data being a network device, and the message is transmitted from the network device to the terminal device. MT data may also be referred to as downlink data.

When MO data or MT data arrives, the terminal device needs to restore RRC connection, thus entering the RRC_CONNECTED state. In the RRC_CONNECTED state, the terminal device may transmit MO data or MT data. After the transmission of MO data or MT data is completed, the terminal device releases the RRC connection and returns to the RRC_INACTIVE state.

In the above process, the terminal device needs to switch from the RRC_INACTIVE state to the RRC_CONNECTED state, and then switch from the RRC_CONNECTED state to the RRC_INACTIVE state. Switching between different RRC states can lead to increased power consumption of the terminal device. However, in some scenarios, the terminal device in the RRC_INACTIVE state needs to transmit some data with small data volume and low transmission frequency (which can be called small packet data). If the terminal device switches to the RRC_CONNECTED state and then transmits data, the signaling overhead required by the terminal device for RRC state switching may even be greater than the overhead required for transmitting these data, resulting in unnecessary power consumption and signaling overhead.

The small data packet in the embodiments of the present disclosure may be instant messaging message, heartbeat packet, periodic data, etc. The embodiment of the present disclosure does not specifically limit the source of the small data packet. As an example, the small data packet may be data from an application (APP) of a terminal device. For example, the small data packet may be data from communication service APPs (such as WhatsApp, QQ, WeChat, etc.), the heartbeat data packets from IM, email clients, or other APPs, push notifications from various applications, etc. As another example, the small data packet may be data from a non-terminal device application. For example, small data packets may come from wearable devices (such as periodic positioning information, etc.), sensor data (such as temperature information and pressure information sent by industrial wireless sensors periodically or in an event-triggered manner), smart meters and periodic meter readings specified in smart meter network transmission protocols (such as 3GPP TS 22.891), etc.

In order to reduce the power consumption of terminal device, the SDT scheme in the RRC_INACTIVE state is discussed in Release-17. In this scheme, the terminal device may perform small data transmission in the RRC_INACTIVE state, that is, there is no need to switch from the RRC_INACTIVE state to the RRC_CONNECTED state. The small data transmission of the embodiments of the present disclosure may include uplink small data transmission and downlink small data transmission. Hereinafter, the uplink small data transmission is mainly described.

In the RRC_INACTIVE state, the terminal device may perform SDT according to the resources configured by the network device. There are two ways for the terminal device to perform SDT. One is SDT based on random access procedure, and the other is SDT based on configured grant (CG). These two situations are introduced respectively below.

SDT based on random access procedure refers to the terminal device being able to perform SDT during the random access procedure. The random access method may be two-step random access procedure or four-step random access procedure. For the two-step random access procedure, the terminal device may perform SDT in message 1 (MSG1). That is, MSG1 of the two-step random access procedure may be used to carry data. For the four-step random access procedure, the terminal device may perform SDT in MSG3. In other words, MSG3 of the four-step random access procedure may be used to carry data.

In random access procedure, the resources of terminal device for SDT can be called RA-SDT resources.

Hereinafter, the two-step random access procedure and the four-step random access procedure are described with reference to FIG. 3 and FIG. 4, respectively.

Figure 3:
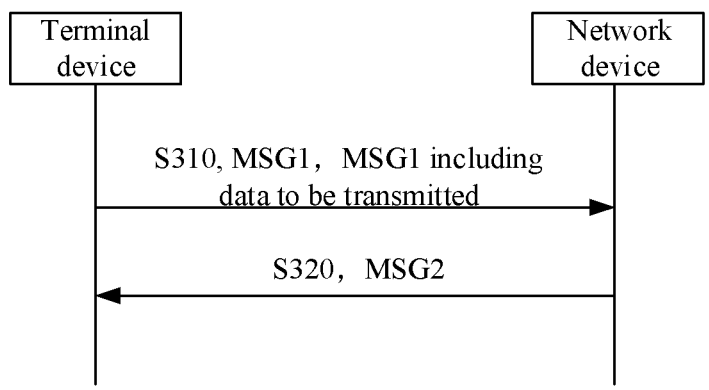
FIG. 3 is a schematic flowchart of performing SDT based on two-step random access procedure.

FIG. 3 shows a schematic flowchart of SDT performed in a two-step random access procedure.

In S310, a terminal device sends MSG1 to a network device. The terminal device may send MSG1 on the random access channel (RACH) resources configured by the network device. MSG1 may carry data to be transmitted (or referred to as uplink data or MO data). If MSG1 is used for SDT, the resources for transmitting MSG1 may also be referred to as RA-SDT resources. For example, the RA-SDT resource may be a RACH resource.

In S320, the network device sends MSG2 to the terminal device. The MSG2 may include a response to the data to be transmitted.

Figure 4:
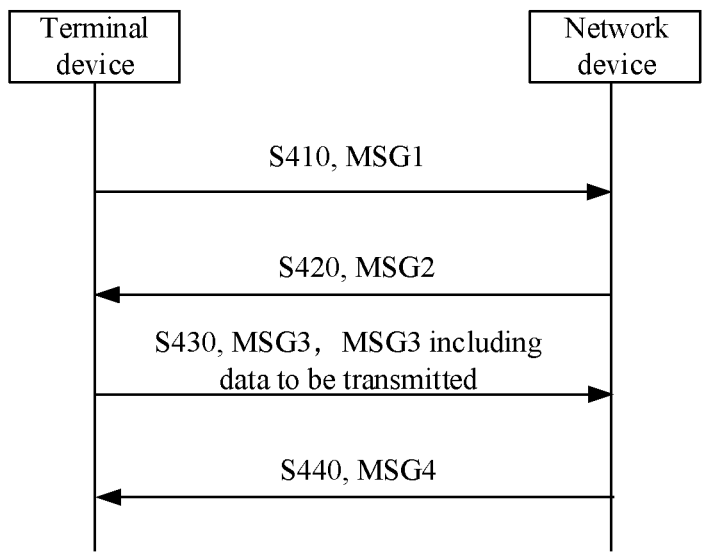
FIG. 4 is a schematic flowchart of performing SDT based on four-step random access procedure.

FIG. 4 shows a schematic flowchart of SDT performed in a four-step random access procedure.

In S410, a terminal device sends MSG1 to a network device. MSG1 carries a random access preamble.

In S420, the network device sends MSG2 to the terminal device. The MSG2 may also be called random access response (RAR). MSG2 may also include an uplink grant (UL grant), which is used to schedule the uplink resource indication of MSG3.

In S430, the terminal device may send MSG3 to the network device on the uplink grant scheduled by the network device. MSG3 carries data to be transmitted. If MSG3 is used for SDT, the resources for transmitting MSG3 (that is, the uplink grant scheduled by the network device) may also be called RA-SDT resources.

In S440, the network device sends MSG4 to the terminal device. The MSG4 may include a response to the data to be transmitted.

Configured grant may also be referred to as uplink grant free. Configured grant may refer to that the network device grants the terminal device by activating the uplink once, and the terminal device may always use the resources designated by the activated uplink grant (CG resources) for uplink transmission without receiving the deactivation instruction. In the embodiments of the present disclosure, the terminal device may use CG resources for SDT. CG resources used for SDT may also be called CG-SDT resources.

The network device may indicate CG-SDT resources by sending CG-SDT resource configuration information (or CG-SDT resource configuration parameters) to the terminal device. The CG-SDT resource configuration information may be carried in the RRC connection release message. In some embodiments, the CG-SDT resource configuration information is only applicable to the current RRC connection release message. That is, if the state of the terminal device is changed, such as cell handover or RRC reconnection (such as switching from RRC_INACTIVE state to RRC_CONNECTED state), the CG-SDT resource configuration information becomes invalid.

The CG-SDT resource configuration information may include information related to conducting SDT. For example, the CG-SDT resource configuration information may include one or more of the following information: one or more periodic time-frequency resources, modulation and coding scheme (MCS), transport block size (TBS), multiple physical uplink shared channel, PUSCH) repetition, starting position, wireless network temporary identity (C-RNTI) (such as CG-SDT C-RNTI), TA verification criteria, allowed CG-SDT resource hopping, whether CG-SDT resource allocated for one or more occasion, demodulation reference signal (DMRS) configuration, power control parameters, physical downlink control channel (PDC) search space, coverage enhancement (CE) repeated validity and other ancillary parameters.

The type of configured grant may be, for example, CG type 1 or CG type 2. The configuration parameters of CG type 1 may be configured by RRC through signaling in higher layer. This high-level signaling may be, for example, IE ConfiguredGrantConfig. Parameters required by CG type 2 are also configured by IE ConfiguredGrantConfig, but resources of CG type 2 need to be activated and deactivated by downlink control information (DCI), and only resources activated by DCI may be used. CG type 1 and CG type 2 may be distinguished according to the field rrc-ConfigureUplinkGrant in IE ConfiguredGrantConfig. If the field rrc-ConfiguredDuplinkGrant is configured, the type of configured grant is CG type 1; if the field rrc-ConfiguredDuplinkGrant is not configured, the type of configured grant is CG type 2.

The network device may configure a terminal device-specific time domain resource assignment (TDRA) table to the terminal device. The TDRA table may be carried in the RRC connection release message. The TDRA table may be used to schedule SDT resources or subsequent SDT resources or SDT retransmission resources. The above SDT resources may be RA-SDT resources or CG-SDT resources. The above resources may also be PUSCH resources.

Taking the CG-SDT resource as an example, candidate value set for the association period of Synchronization Signal Block (SSB) to CG PUSCH mapping may be set similarly to the definition of a set with N candidate values for the association of SSB to PRACH Occasion (RO) mapping. The parameter N may be configured through the parameters in higher layer. If N<1, one SSB is mapped to 1/N consecutive valid CG PUSCHs. If N≥1, N consecutive SSBs are associated with one CG PUSCH. If N<1, multiple terminal devices may share the same resource, i.e., the same resource may be assigned to different terminal devices. If N≥1, a terminal device may get dedicated resources, and different terminal devices may get different resources.

Before conducting SDT, whether the terminal device meets the conditions for triggering SDT is determined. The terminal device may perform SDT only if the conditions for triggering SDT are met, that is, the terminal device may initiate the SDT process if the conditions for triggering SDT are met. If the conditions for triggering SDT are not met, the terminal device may initiate an RRC resume process. For example, the terminal device may switch from the RRC_INACTIVE state to the RRC_CONNECTED state to perform data transmission.

The conditions for triggering SDT may include one or more of the following: the data to be transmitted coming from a radio bearer that can trigger SDT, a data volume of the data to be transmitted being less than a pre-configured data volume threshold, a measurement result of downlink reference signal receiving power (RSRP) being greater than a pre-configured RSRP threshold, a valid SDT resource existing. The above conditions are introduced respectively below.

In some embodiments, the condition for triggering SDT is related to the radio bearer where the data to be transmitted is located. The embodiments of the present disclosure may determine, based on whether the data to be transmitted comes from a radio bearer that can trigger SDT, whether the terminal device meets the conditions for triggering SDT. If the data to be transmitted comes from a radio bearer that can trigger SDT, the terminal device meets the conditions for triggering SDT. If the data to be transmitted is not from a radio bearer that can trigger SDT, the terminal device does not meet the conditions for triggering SDT. The radio bearer may be, for example, a signaling radio bearer (SRB) or a data radio bearer (DRB).

In some embodiments, the condition for triggering SDT is related to the data volume of data to be transmitted. If the data volume of data to be transmitted is small, for example, the data to be transmitted is small packet data, the terminal device meets the conditions for triggering SDT. If the data volume of data to be transmitted is large, the terminal device does not meet the conditions for triggering SDT. According to the embodiments of the present disclosure, it is also possible to determine, by comparing the data volume of the data to be transmitted with a data volume threshold, whether the terminal device meets the conditions for triggering SDT. If the data volume of the data to be transmitted is less than the data volume threshold, the terminal device meets the condition of triggering SDT. If the data volume of the data to be transmitted is greater than or equal to the data volume threshold, the terminal device does not meet the conditions for triggering SDT. The data threshold may be pre-configured by the network device or pre-defined in the protocol.

In some embodiments, the condition for triggering SDT is related to the measurement result of downlink RSRP. If the measurement result of downlink RSRP is greater than an RSRP threshold, it indicates that the signal quality is good, and the terminal device meets the conditions for triggering SDT. If the measurement result of downlink RSRP is less than or equal to the RSRP threshold, it indicates that the signal quality is poor, and the terminal device does not meet the conditions for triggering SDT. The RSRP threshold may be pre-configured by the network device or pre-defined in the protocol.

In some embodiments, the condition for triggering SDT is related to whether there is a valid SDT resource. If there are valid SDT resources, the terminal device meets the conditions for triggering SDT, and the terminal device may use the valid SDT resources for data transmission. If there are no valid SDT resources, the terminal device does not meet the conditions for triggering SDT, and the terminal device has no available SDT resources for data transmission. SDT resources may be RA-SDT resources described above, and/or CG-SDT resources.

If the terminal device is configured with both RA-SDT and CG-SDT resources, when determining there is a valid SDT resource, the terminal device may determine the validity of both RA-SDT resources and CG-SDT resources, or the terminal device may determine the validity of one SDT resource first, and then determine the validity of the other SDT resource. For example, the terminal device may first determine whether there is a valid RA-SDT resource, and then determine whether there is a valid CG-SDT resource. For another example, the terminal device may first determine whether there is a valid CG-SDT resource, and then determine whether there is a valid RA-SDT resource. The following description takes the case that the terminal device first determines whether there is a valid CG-SDT resource and then determines whether there is a valid RA-SDT resource as an example.

In some embodiments, whether CG-SDT resources are valid or not is related to whether there is a valid timing advance (TA). TA is related to the uplink synchronization of the terminal device. If TA is valid, it means that the terminal device is in the uplink synchronization state; if TA is invalid, it indicates that the terminal device is in an uplink out of synchronization state. According to the embodiments of the present disclosure, the validity of CG-SDT resources may be determined by determining whether there is a valid TA. If there is a valid TA, it may indicate that the CG-SDT resource is valid. If there is no valid TA, it may indicate that the CG-SDT resource is invalid.

The validity of TA is related to whether the TA timer (TAT) of SDT is running. The network device may configure a TA timer for the terminal device, and the TA timer may be used for the terminal device to determine the duration of uplink synchronization. If the TA timer is running, that is, the TA timer has not timed out, it indicates that there is a valid TA. If the TA timer is not running, that is, the TA timer has timed out, it indicates that there is no valid TA.

The TA timer may be started after the terminal device receives the RRC connection release message or the terminal device enters the RRC_INACTIVE state. The duration of the TA timer may be configured by the network device to the terminal device. For example, after receiving the RRC connection release message sent by the network device, the terminal device may enter the RRC_INACTIVE state according to the indication information in the RRC connection release message. The RRC connection release message may further include the configuration information of the SDT-TA timer, and the terminal device may start the SDT-TA timer based on the configuration information of the SDT-TA timer.

At present, there is no clear way to ensure the data transmission of the terminal device and avoid the waste of resources when the terminal device carries out SDT. If the terminal device uses dedicated resources for SDT, although it can ensure data transmission of the terminal device, it may lead to resource waste. Resource sharing can improve resource utilization, such as the unused resources of one terminal device can be used by other terminal devices. However, there may be resource conflicts in the way of resource sharing, where two terminal devices may seize the same resource.

Based on this, a method and a device for wireless communication are provided according to the embodiments of the present disclosure, and by limiting the length of time that a terminal device uses a dedicated resource (such as the first transmission resource), the terminal device only uses the first transmission resource for SDT at part of the time, and uses a shared resource for SDT at other times. Thus, it can ensure the data transmission of the terminal device while avoiding the waste of resources to a certain extent.

Figure 5:
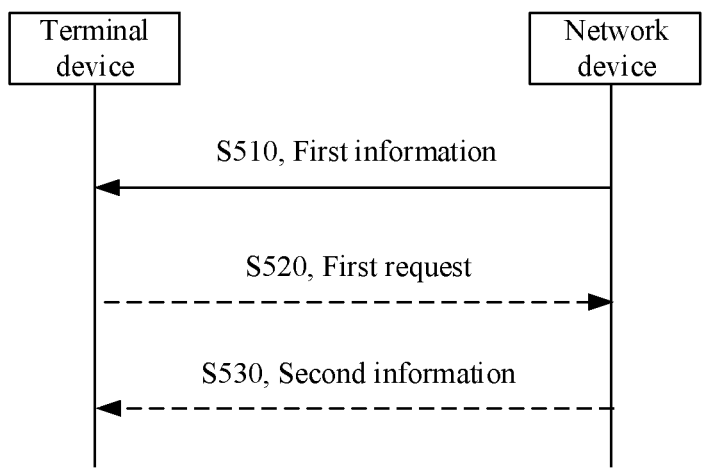
FIG. 5 is a schematic flowchart of a wireless communication method provided by an embodiment of the present disclosure.

Referring to FIG. 5, the wireless communication method in the embodiments of the present disclosure is introduced.

Referring to FIG. 5, in S510, a network device sends a first information to a terminal device. The first information is used to indicate a first timer, and the first timer is used to indicate duration of SDT using a first transmission resource.

The first transmission resource may be a dedicated resource of the terminal device, and may be configured by the network device to the terminal device. For example, the first transmission resource may be a CG-SDT resource or a resource specified by CG type 1.

The first timer may be used to limit the duration for which the terminal device uses the first transmission resource. In other words, the terminal device cannot always use the first transmission resource, but can only use the first transmission resource within the valid period of the first timer. If the first timer does not time out, the terminal device can use the first transmission resource. If the first timer times out, the terminal device cannot continue to use the first transmission resource. Of course, as long as the first timer does not time out, the terminal device can use the first transmission resource to perform SDT for many times.

The first timer may be indicated by the network device to the terminal device. The network device may directly indicate the first timer to the terminal device, for example, the network device may directly indicate the duration of the first timer to the terminal device. In some embodiments, the first timer may be determined based on other timers. For example, the first timer may be determined based on a TA timer. The duration of the first timer may be equal to duration of the TA timer, or the duration of the first timer may be obtained by adding or subtracting a preset duration from the duration of the TA timer. For example, the first timer=TA timer+duration 1. For another example, the first timer=TA timer-duration 2. In this case, the network device may indicate a preset duration to the terminal device, and the terminal device may determine the first timer based on the preset duration and the TA timer.

The duration of the first timer is shorter than duration of a second timer. The duration of the second timer is duration of SDT performed by the terminal device. Before performing SDT, the terminal device determines whether it meets the conditions for conducting SDT. If the terminal device meets the conditions for SDT, it can perform SDT. However, the terminal device cannot continuously perform SDT. The network device configures a second timer for the terminal device to limit the duration that the terminal device can perform SDT. The duration of the second timer may be understood as the duration that the terminal device performs SDT in one cycle. If the second timer times out, the terminal device may not be able to perform SDT. If a small data packet arrives at the terminal device later, the terminal device needs to determine again whether the conditions for SDT are met, if so, the terminal device can perform SDT within the duration specified by the second timer based on the configuration of the network device.

The first information may be carried in RRC signaling, in other words, the network device may configure the first timer for the terminal device through the RRC signaling. In some embodiments, the first information may be carried in CG-SDT resource configuration information, and the network device may indicate the first timer to the terminal device by multiplexing CG-SDT resource configuration information, thus saving signaling overhead.

The first timer and the second timer may be carried in the same message. For example, both the first timer and the second timer may be carried in CG-SDT resource configuration information. The network device may indicate both the first timer and the second timer to the terminal device through the CG-SDT resource configuration information.

The embodiments of the present disclosure do not specifically limit the start time points of the first timer and the second timer. The start time points of the first timer and the second timer may be the same or different from each other. For example, the terminal device may start the first timer at the moment of receiving the first information. If the first information is carried in the CG-SDT resource configuration information, the terminal device may start the first timer after receiving the CG-SDT resource configuration information. Similarly, the network device may also start the first timer after sending CG-SDT resource configuration information to the terminal device. In some embodiments, the terminal device may start the first timer after receiving the RRC connection release message. In some embodiments, the terminal device may also start the first timer when entering the RRC_INACTIVE state. In some embodiments, the terminal device may start the first timer and the second timer at the same time after receiving the CG-SDT resource configuration information.

In the embodiments of the present disclosure, the terminal device may use the first transmission resource to performing SDT within the duration limited by the first timer. In order to improve the resource utilization, after the first timer times out, the terminal device may use the shared resources to performing SDT. The shared resources may also be referred to as allocatable resources in the network device. For example, the terminal device may use the shared resources by monitoring. The network device may indicate the configuration information of a shared resource pool to the terminal device, and the terminal device may monitor the resources in the shared resource pool. If the terminal device monitors that a resource is not occupied by other terminal devices, the terminal device can use the resource for SDT. If the terminal device monitors that a resource has been occupied by other terminal devices, the terminal device cannot use the resource for SDT.

In some embodiments, in order to reduce resource collision, the network devices may also dynamically allocate resources for terminal devices through scheduling. For example, as shown in FIG. 5, in S520, the terminal device may send a first request to the network device, where the first request is used to request a second transmission resource. In S530, after receiving the first request, the network device may send second information to the terminal device, where the second information is used to indicate the second transmission resource.

The first request may also be used to indicate the size of the second transmission resource. In case of sending the first request, the terminal device may indicate the size of the required transmission resources to the network device. For example, the first request may be used to indicate the size of the second transmission resource. After receiving the first request, the network device may allocate a transmission resource corresponding to the size of the second transmission resource to the terminal device. For example, the first request may be used to indicate the size of data to be transmitted (or the amount of data to be transmitted). The terminal device may also report the size of the data to be transmitted to the network device. The network device may determine, based on the size of the data to be transmitted, the size of the second transmission resource required by the terminal device, thereby allocating transmission resources that match the size of the data to be transmitted to the terminal device.

In some embodiments, the allocatable resources in the network device may not meet the transmission requirements of all terminal devices, in other words, the total amount of the transmission resources required by the terminal devices is greater than the allocatable resources. For example, the size of resources that can be allocated in a network device is M, and there are K terminal devices requesting transmission resources from the network device at the same time, and the total amount of transmission resources requested by these K terminal devices is N. If N is greater than M, the available resources cannot simultaneously meet the transmission needs of K terminal devices. Therefore, not all terminal devices can access the transmission resources allocated by network devices. In this case, network devices may determine which terminal devices are allocated transmission resources based on certain allocation strategies.

In order to improve resource utilization, whether transmission resources can be allocated to terminal devices can be determined based on the second information; in other words, the network device may determine the terminal device that can be allocated with the transmission resource based on the second information. The second information includes one or more of the following information: the size of allocatable resources in the network device, resources that are less than or equal to the size of the second transmission resource in the transmission resources requested by other terminal devices, resources that are greater than or equal to the size of the second transmission resource in the transmission resources requested by other terminal devices.

For the convenience of description, the resource smaller than or equal to the second transmission resource size among the transmission resources requested by other terminal devices is called resource A, and the resource larger than or equal to the second transmission resource size among the transmission resources requested by other terminal devices is called resource B.

In some embodiments, if the total amount of the accumulated total amount of resource A and the second transmission resource is less than or equal to the size of the allocatable resource, the network device may allocate the second transmission resource to the terminal device, that is, the terminal device may obtain the second transmission resource. If the total amount of the accumulated total amount of resource A and the second transmission resource is greater than the size of the allocatable resource, the network device cannot allocate the second transmission resource for the terminal device, that is, the terminal device cannot obtain the second transmission resource.

In some embodiments, if the total amount of the accumulated total amount of resource B and the second transmission resource is less than or equal to the size of the allocatable resource, the network device may allocate the second transmission resource to the terminal device, that is, the terminal device may obtain the second transmission resource. If the total amount of the accumulated total amount of resource B and the second transmission resource is greater than the size of the allocatable resource, the network device cannot allocate the second transmission resource for the terminal device, that is, the terminal device cannot obtain the second transmission resource.

The network device may sort the transmission resources requested by multiple terminal devices, such as in descending order or ascending order. The network device may allocate transmission resources to the terminal device according to the sorting order. The allocation strategy of allocating transmission resources in descending order is referred to as a first allocation strategy, while the allocation strategy of allocating transmission resources in ascending order is referred to as a second allocation strategy.

For example, in descending order, the network device may allocate resources to a terminal device requesting the largest transmission resource, and then allocate resources to a terminal device requesting the second largest transmission resource, and so on, until the remaining resources are insufficient for the transmission resources required by a terminal device.

For example, if the allocatable resource in a network device is M, K terminal devices apply for transmission resources at the same time, and the transmission resource applied by each terminal device (UEi) is Si. The network device may sort K transmission resources in descending order, such as $S_0 \geq S_1 \geq \ldots \geq S_{k-1}$, i=0,1 ..., k-1. The network device may schedule transmission resources for the corresponding terminal device in turn according to the above sorting order.

The network device allocates transmission resources to the terminal device in the order of $UE_0$, $UE_1$ ... and $UE_{k-1}$. If the allocatable resource M is greater than or equal to $S_0$, the network device may allocate the transmission resource $S_0$ for $UE_0$. After allocating transmission resources for $UE_0$, the allocatable resources become $M-S_0$. If $M-S_0$ is greater than or equal to $S_1$, the network device may allocate transmission resources $S_1$ for $UE_1$. After allocating transmission resources for $UE_1$, the allocatable resources become $M-S_0-S_1$. By analogy, until the remaining allocatable resources cannot meet the transmission resource requirements of the next terminal device, the allocation of the allocatable resource stops. For example, if $M-S_0-S_1$ is less than $S_2$, that is, the remaining allocatable resources cannot meet the transmission requirements of $UE_2$, the network device may not allocate transmission resources for $UE_2$.

In some embodiments, if the remaining allocatable resources cannot meet the transmission requirements of the next terminal device, the network device may determine whether the remaining transmission resources can meet the transmission resource requirements of other terminal devices. For example, if the remaining transmission resources cannot meet the transmission needs of the first terminal, the network device may determine whether the remaining transmission resources meet the transmission needs of the second terminal, whereas the transmission resources required by the second terminal are less than the transmission resources required by the first terminal.

For example, the above K terminal devices are taken as an example, if the remaining transmission resources cannot meet the transmission requirements of $UE_2$, the network device may skip $UE_2$ and determine whether the remaining transmission resources can meet the transmission requirements of $UE_3$. If the remaining transmission resources can meet the transmission requirements of $UE_3$, that is, $M-S_0-S_1$ is greater than or equal to $S_3$, the network device can allocate transmission resources $S_3$ for $UE_3$. If the remaining transmission resources cannot meet the transmission requirements of $UE_3$, that is, $M-S_0-S_1$ is less than $S_3$, the network device can skip $UE_3$ and determine whether the remaining transmission resources can meet the transmission requirements of $UE_4$. And so on, until the remaining transmission resources cannot meet the transmission requirements of any terminal device.

In some embodiments, when determining the second terminal, the network device may also determine the second terminal based on the ascending order of required transmission resources. For example, the above K terminal devices are taken as an example, if the remaining transmission resources cannot meet the transmission requirements of $UE_2$, the network device may determine whether the remaining transmission resources can meet the transmission requirements of $UE_{k-1}$. After allocating transmission resources for $UE_{k-1}$, the remaining allocatable transmission resources become $M-S_0-S_1-S_{k-1}$. The network device may continue to determine whether the remaining allocatable resources can meet the transmission requirements of $S_{k-2}$, and so on. If the remaining transmission resources cannot meet the transmission requirements of $UE_{k-1}$, that is, $M-S_0-S_1$ is less than $S_{k-1}$, the network device does not allocate transmission resources for $UE_{k-1}$. Due to the fact that the remaining transmission resources cannot meet the transmission requirements of $UE_{k-1}$, and $UE_{k-1}$ has the smallest transmission requirement, the remaining transmission resources cannot meet the transmission requirements of all remaining terminal devices, and the network device does not need to continue to determine whether it can meet the transmission requirements of other terminals, thus saving the judgment resources of the network device.

For example, in the ascending order, the network device may allocate resources to a terminal device with the smallest transmission resources, and then allocate resources to a terminal device with the second smallest transmission resources. And so on, until the remaining resources are insufficient for the transmission resources required by a terminal device.

For example, if the available resources in the network device are M, K terminal devices simultaneously apply for transmission resources, and each terminal device (UEi') applies for transmission resources of Si'. The network device may sort K transmission resources in ascending order, such as $S_0' \leq S_1' \leq \ldots \leq S_{k-1}'$, $i=0,1 \ldots, k-1$. The network device may schedule transmission resources for the corresponding terminal devices in the above order.

The network device allocates transmission resources to the terminal device in the order of $UE_0'$, $UE_1'$, $UE_{k-1}'$. If the allocatable resource M is greater than or equal to $S_0'$, the network device may allocate the transmission resource $S_0'$ for $UE_0'$. After allocating transmission resources to $UE_0'$, the allocatable resources become $M-S_0'$. If $M-S_0'$ is greater than or equal to $S_1'$, the network device may allocate transmission resource $S_1'$ for $UE_1'$. After allocating transmission resources to $UE_1'$, the allocatable resources become $M-S_0'-S_1'$. By analogy, until the remaining allocatable resources cannot meet the transmission resource requirements of the next terminal device. For example, if $M-S_0'-S_1'$ is less than $S_2'$, that is, the remaining allocatable resources cannot meet the transmission requirements of $UE_2'$, the network device may not allocate transmission resources for $UE_2'$. Since the transmission resources required by the terminal equipments after $UE_2'$ are larger than the transmission resources required by $UE_2'$, if the remaining transmission resources cannot meet the transmission requirements of $UE_2'$, they cannot meet the transmission requirements of terminal devices after $UE_2'$, and the network device may not need to determine whether the remaining transmission resources can meet the transmission requirements of other terminal devices.

In some embodiments, the network device may compare the above-mentioned multiple allocation strategies to select the optimal allocation strategy, for example, select the allocation strategy with the highest resource utilization rate, or select the allocation strategy with the largest number of terminal devices that can be allocated.

For example, the network device may compare the allocation results of the first allocation strategy and the second allocation strategy, and select the allocation strategy with the highest resource utilization rate from the first allocation strategy and the second allocation strategy. The resource utilization ratio may refer to the ratio of the resources allocated by the network device to the allocatable resources in the network device.

The network device may record the allocation results of the first allocation strategy and the second allocation strategy. For example, the network device may set an allocation coefficient for each terminal device to indicate that the transmission resources are allocated successfully or cannot be allocated. For example, an allocation coefficient of 1 may indicate successful allocation, while an allocation coefficient of 0 indicates inability to allocate. The resources ultimately allocated by the network device may be the cumulative sum of the allocation coefficient of each terminal device multiplied by its required transmission resources. The network device may choose the allocation strategy with the most resources finally allocated as the final allocation strategy, and complete the allocation of resources according to the final allocation strategy. For example, if the resources allocated according to the first allocation strategy are greater than those allocated according to the second allocation strategy, the network device may allocate resources to the terminal devices according to the first allocation strategy.

Figure 6:
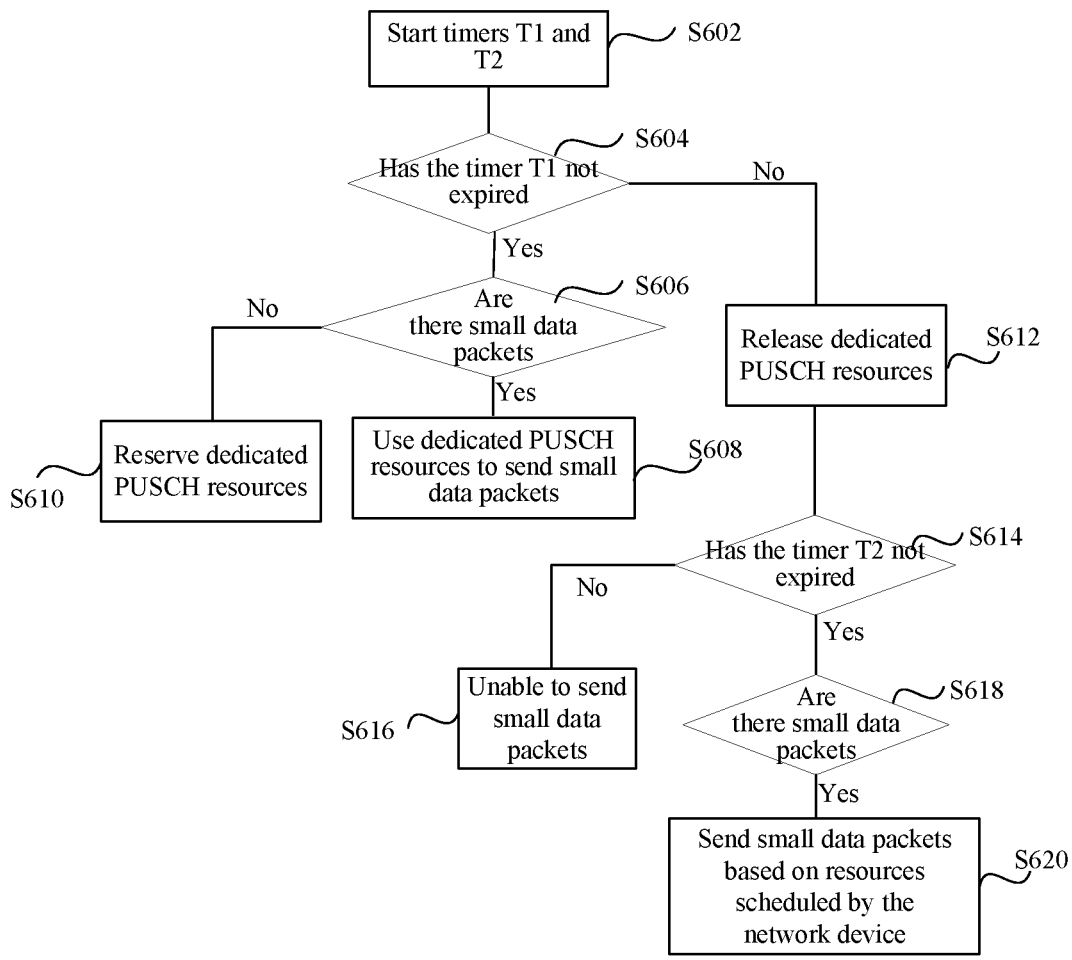
FIG. 6 is a schematic flowchart of a wireless communication method provided by another embodiment of the present disclosure.
Figure 7:
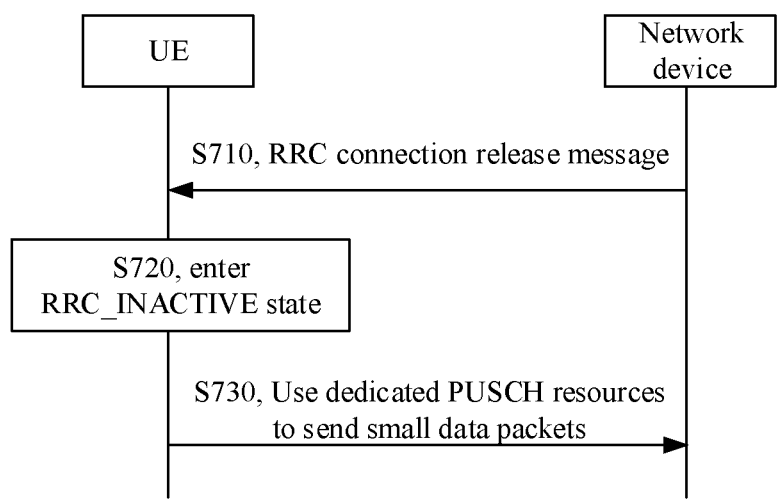
FIG. 7 is a schematic flowchart of a terminal device performing SDT provided by an embodiment of the present disclosure.
Figure 8:
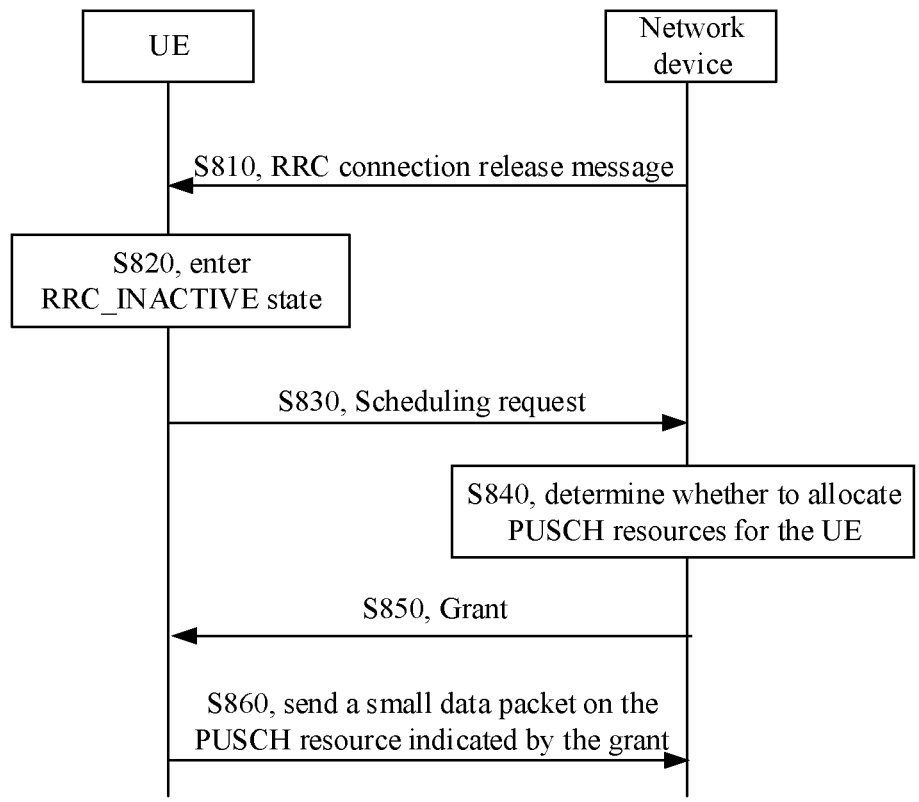
FIG. 8 is a schematic flowchart of a terminal device performing SDT provided by another embodiment of the present disclosure.

Referring to FIG. 6 to FIG. 8, the wireless communication method according to the embodiments of the present disclosure is described in detail.

Referring to FIG. 6, in S602, UE in the RRC_INACTIVE state starts a timer T1 and a timer T2. It should be noted that the timer T1 here may be the first timer described above, and the timer T2 may be the second timer described above.

In S604, the UE determines whether the timer T1 has expired.

In S606, if the timer T1 has not expired, the UE may determine whether there is a small data packet to be transmitted.

In S608, if there is a small data packet to be transmitted, the UE may use dedicated PUSCH resources to send the small data packet.

In S610, if there is not a small data packet to be transmitted, the UE may reserve dedicated PUSCH resources.

In S612, if the timer T1 has expired, the UE may release the dedicated PUSCH resources.

In S614, if the timer T1 has expired, the UE determines whether the timer T2 has expired.

In S616, if the timer T2 has expired, the UE cannot send a small data packet.

In S618, if the timer T2 has not expired, the UE determines whether there is a small data packet to be transmitted.

In S620, if there is a small data packet to be transmitted, the UE may send the small data packet based on the resources scheduled by the network device.

In case that timer T1 has not timed out, UE may use dedicated PUSCH resources to send small data packets. The process thereof may be shown in FIG. 7.

Referring to FIG. 7, in S710, a UE in the RRC_CONNECTED state may receive an RRC connection release message sent by a network device. The RRC connection release message may include CG-SDT resource configuration information.

In S720, after receiving the RRC connection release message, the UE may release the RRC connection with the network device, thus entering the RRC_INACTIVE state. In addition, the UE may obtain the timer T1 according to the CG-SDT resource configuration information.

In S730, within the validity period of the timer T1, the UE uses dedicated PUSCH resources to send small data packets.

In the case that the timer T1 has timed out but the timer T2 has not yet timed out, the UE may send a small data packet based on the resources scheduled by the network device. The process thereof may be shown in FIG. 8.

Referring to FIG. 8, in S810, a UE in the RRC_CONNECTED state may receive an RRC connection release message sent by a network device. The RRC connection release message may include CG-SDT resource configuration information.

In S820, after receiving the RRC connection release message, the UE may release the RRC connection with the network device, thus entering the RRC_INACTIVE state. In addition, the UE may obtain the timer T1 and the timer T2 according to the CG-SDT resource configuration information.

In S830, the UE sends a scheduling request to the network device to request PUSCH resources.

In S840, the network device determines whether to allocate PUSCH resources for the UE according to a certain scheduling strategy.

In S850, if the network device determines to allocate PUSCH resources to the UE, the network device may send a grant to the UE to indicate the PUSCH resources.

In S860, after receiving the grant, the UE may send a small data packet on the PUSCH resource indicated by the grant. In some embodiments, the UE may also send common control channel (CCCH) information on the PUSCH resource. The CCCH information may be used to establish RRC connection or SRB, or the CCCH may be used in RRC reconstruction process. For example, the CCCH may be used for UE to switch from the RRC_INACTIVE state to the RRC_CONNECTED state.

Figure 9:
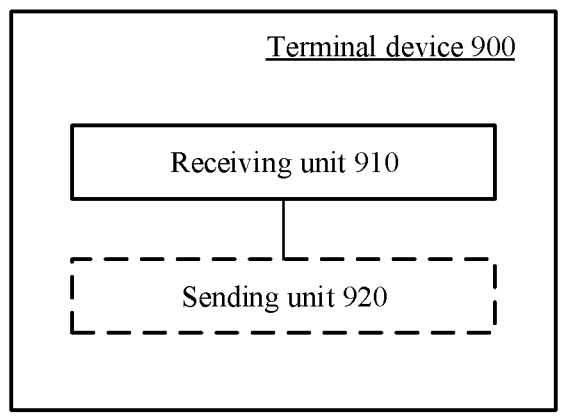
FIG. 9 is a schematic structural diagram of a terminal device provided by an embodiment of the present disclosure.
Figure 10:
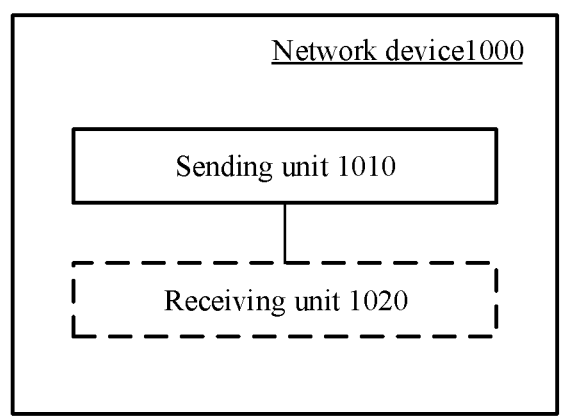
FIG. 10 is a schematic structural diagram of a network device provided by an embodiment of the present disclosure.
Figure 11:
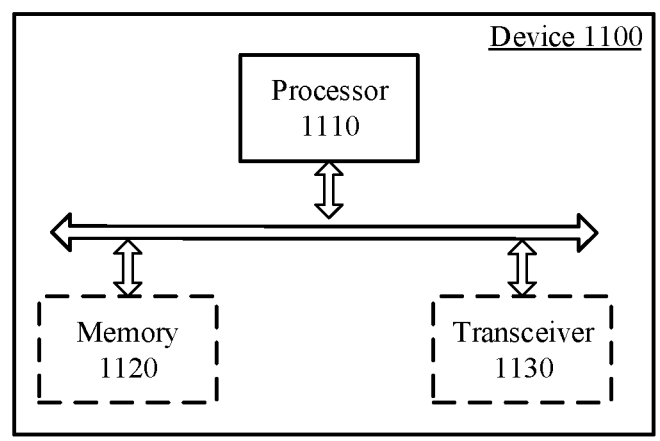
FIG. 11 is a schematic structural diagram of a communication device provided by an embodiment of the present disclosure.

Referring to FIG. 1 to FIG. 8, the method embodiments of the present disclosure are described in detail. Referring to FIG. 9 to FIG. 11, the device embodiments of the present disclosure are described in detail. It should be understood that the illustration of the method embodiments and the illustration of the device embodiments correspond to each other, and therefore, the parts not described in detail may refer to the previous method embodiments. FIG. 9 is a schematic structural diagram of a terminal device provided by an embodiment of the present disclosure. The terminal device shown in FIG. 9 may be any of the terminal devices described above. The terminal device 900 includes a receiving unit 910.

The receiving unit 910 is configured to receive first information sent by a network device. The first information is used for indicating a first timer, and the first timer is used for indicating duration of performing SDT using a first transmission resource. Duration of the first timer is shorter than duration of a second timer, and the second timer is used to indicate duration of SDT performed by the terminal device.

In some embodiments, the terminal device 900 further includes: a sending unit 920, configured to send a first request to the network device when the first timer has timed out and the second timer has not timed out. The first request is used to request a second transmission resource. The receiving unit is used for receiving second information sent by the network device, and the second information is used for indicating a second transmission resource.

In some embodiments, the first request is used to indicate the size of the second transmission resource. It is determined whether the terminal device can obtain the second transmission resource based on the second information, and the second information includes one or more of the following information: the size of allocatable resources in the network device; resources that are less than or equal to the size of the second transmission resource in the transmission resources requested by other terminal devices; resources that are greater than or equal to the size of the second transmission resource in the transmission resources requested by other terminal devices.

In some embodiments, the first transmission resource is a dedicated resource of the terminal device.

In some embodiments, the duration of the first timer is determined based on a TA timer.

In some embodiments, the first information is carried in CG-SDT resource configuration information.

FIG. 10 is a schematic structural diagram of a network device provided by an embodiment of the present disclosure. The network device shown in FIG. 10 may be any of the network devices described above. The network device 1000 includes a sending unit 1010.

The sending unit 1010 is configured to send first information to a terminal device. The first information is used to indicate a first timer, and the first timer is used for indicating duration of performing SDT using a first transmission resource. Duration of the first timer is shorter than duration of a second timer, and the second timer is used to indicate the duration of SDT performed by the terminal device.

In some embodiments, the network device 1000 further includes: a receiving unit 1020, configured to receive a first request sent by the terminal device under the condition that the first timer has timed out and the second timer has not timed out. The first request is used to request a second transmission resource. The sending unit is configured to send second information to the terminal device, and the second information is configured to indicate a second transmission resource.

In some embodiments, the first request is used to indicate the size of the second transmission resource, and whether the terminal device can obtain the second transmission resource is determined based on the second information. The second information includes one or more of the following information: the size of allocatable resources in the network device; resources that are less than or equal to the size of the second transmission resource in the transmission resources requested by other terminal devices; resources that are greater than or equal to the size of the second transmission resource in the transmission resources requested by other terminal devices.

In some embodiments, the first transmission resource is a dedicated resource of the terminal device.

In some embodiments, the duration of the first timer is determined based on a TA timer.

In some embodiments, the first information is carried in CG-SDT resource configuration information.

FIG. 11 is a schematic structural diagram of a device according to an embodiment of the present disclosure. The dashed line in FIG. 11 indicates that the unit or module is optional. The device 1100 may be used to implement the method described in the above method embodiments. The device 1100 may be a chip, a terminal device or a network device.

The device 1100 may include one or more processors 1110. The processor 1110 may support the device 1100 to implement the method described in the previous method embodiments. The processor 1110 may be a general-purpose processor or a dedicated processor. For example, the processor may be a central processing unit (CPU). Alternatively, the processor may also be other general processors, digital signal processor (DSP), application specific integrated circuits (ASIC), field programmable gate array (FPGA) or other programmable logic devices, discrete gate or transistor logic devices, discrete hardware components, etc. The general-purpose processor may be a microprocessor or the processor may be any conventional processor, etc.

The device 1100 may further include one or more memories 1120. A program is stored on the memory 1120, which can be executed by the processor 1110, so that the processor 1110 performs the method described in the above method embodiments. The memory 1120 may be independent of or integrated in the processor 1110.

The device 1100 may further include a transceiver 1130. The processor 1110 may communicate with other devices or chips through the transceiver 1130. For example, the processor 1110 may transmit and receive data with other devices or chips through the transceiver 1130.

The embodiments of the present disclosure further provide a computer-readable storage medium for storing a program. The computer-readable storage medium may be applied to a terminal device or a network device provided by the embodiments of the present disclosure, and the program causes a computer to implement the method performed by the terminal device or the network device in various embodiments of the present disclosure.

The embodiments of the present disclosure further provide a computer program product, which includes a program. The computer program product may be applied to the terminal device or the network device provided in the embodiments of the present disclosure, and the program causes a computer to implement the methods performed by the terminal device or the network device in various embodiments of the present disclosure.

The embodiments of the present disclosure further provide a computer program. The computer program may be applied to the terminal device or the network device provided in the embodiments of the present disclosure, and the computer program causes a computer to implement the methods performed by the terminal device or the network device in various embodiments of the present disclosure.

It should be understood that in the embodiments of the present disclosure, "B corresponding to A" indicates that B is associated with A, and B may be determined based on A. But it should also be understood that determining B based on A does not mean determining B solely based on A, and B may also be determined based on A and/or other information.

It should be understood that the term "and/or" herein is only a description of the association relationship between related objects, indicating that there may be three types of relationships, for example, A and/or B may represent the presence of A alone, the presence of A and B simultaneously, and the presence of B alone. In addition, the character '/' herein generally indicates that the associated object is an 'or' relationship.

It should be understood that in various embodiments of the present disclosure, the size of the serial number of the above-mentioned processes does not mean the order of execution, and the order of execution of each process should be determined according to its function and internal logic, and should not constitute any limitation on the implementation process of the embodiments of the present disclosure.

In several embodiments provided by the present disclosure, it should be understood that the disclosed systems, devices and methods may be realized in other ways. For example, the device embodiments described above are only schematic. For example, the division of the units is only a logical function division, and there may be another division method in actual implementation, for example, multiple units or components may be combined or integrated into another system, or some features may be ignored or not implemented. On the other hand, the mutual coupling or direct coupling or communication connection shown or discussed may be indirect coupling or communication connection through some interfaces, devices or units, which may be electrical, mechanical or other forms.

The units described as separate components may or may not be physically separated, the components displayed as units may be or may not be physical units, which may be located in one place or distributed across multiple network units. Some or all of the units may be selected according to actual needs to achieve the objective of the embodiments.

In addition, each functional unit in various embodiments of the present disclosure may be integrated into one processing unit, or each unit may exist physically alone, or two or more units may be integrated into one unit.

In the above embodiments, the disclosed systems, devices and methods may be realized in whole or in part by software, hardware, firmware or any combination thereof. When implemented in software, it may be fully or partially implemented in the form of a computer program product. The computer program product includes one or more computer instructions. When loading and executing the computer program instructions on a computer, all or part of the processes or functions described in the embodiments of the present disclosure are generated. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from one website, computer, server or data center to another website, computer, server or data center by wired (such as coaxial cable, optical fiber, digital subscriber line (DSL)) or wireless (such as infrared, wireless, microwave, etc.). The computer-readable storage medium may be any available medium that the computer can read, or a data storage device such as a server or data center that integrated by one or more available media. The available medium may be a magnetic medium (e.g., floppy disk, hard disk, magnetic tape), an optical medium (e.g., digital video disc (DVD)) or a semiconductor medium (e.g., solid state disk (SSD)) and the like.

The above are only the embodiments of the present disclosure, but the protection scope of the present disclosure is not limited to this. Any person familiar with the technical field can easily think of changes or substitutions within the technical scope disclosed in this disclosure, which should be covered by the protection scope of this disclosure. Therefore, the protection scope of this disclosure should be based on the protection scope of the claims.

What is claimed is:

1. A method for wireless communication, comprising:
receiving, by a terminal device, first information sent by a network device, wherein the first information indicates a first timer, and the first timer has a first duration of performing small data transmission (SDT) using a first transmission resource, wherein the first duration is shorter than a second duration of a second timer, and the second duration is a duration related to a SDT performed by the terminal device;
in response to the first timer having expired and the second timer having not expired, sending, by the terminal device, a first request to the network device, wherein the first request comprises a request for a second transmission resource; and
receiving, by the terminal device, second information sent by the network device, wherein the second information indicates the second transmission resource.

2. The method according to claim 1, wherein the second information comprises one or more of the following information: a size of allocatable resources in the network device, scheduled SDT resources, subsequent SDT resources, or SDT retransmission resources, or a size of transmission resources requested by other terminal devices in resource pool.

3. The method according to claim 1, wherein the first transmission resource is a dedicated resource of the terminal device.

4. The method according to claim 1, wherein the first duration of the first timer is determined based on a timing advance (TA) timer.

5. The method according to claim 1, wherein the first information is carried in SDT based on configured grant (CG-SDT) resource configuration information.

6. A method for wireless communication, comprising:
sending, from a network device, first information to a terminal device, wherein the first information indicates a first timer, and the first timer has a first duration of performing small data transmission (SDT) using a first transmission resource,
wherein the first duration is shorter than a second duration of a second timer, and the second duration is a duration related to a of SDT performed by the terminal device;
receiving, by the network device, a first request sent by the terminal device in response to the first timer having expired and the second timer having not expired, wherein the first request comprises a request for a second transmission resource; and
sending, by the network device, second information to the terminal device, wherein the second information indicates the second transmission resource.

7. The method according to claim 6, wherein the second information comprises one or more of the following information: a size of allocatable resources in the network device, scheduled SDT resources, subsequent SDT resources, or SDT retransmission resources, or a size of transmission resources requested by other terminal devices in resource pool.

8. The method according to claim 6, wherein the first transmission resource is a dedicated resource of the terminal device.

9. The method according to claim 6, wherein the first duration of the first timer is determined based on a timing advance (TA) timer.

10. The method according to claim 6, wherein the first information is carried in SDT based on configured grant (CG-SDT) resource configuration information.

11. A terminal device, comprising:
at least one processor; and
one or more memories coupled to the at least one processor and storing programming instructions for execution by the at least one processor to cause the terminal device to perform operations comprising:
receiving first information sent by a network device, wherein the first information indicates a first timer, and the first timer has a first duration of performing small data transmission (SDT) using a first transmission resource,
wherein the first duration is shorter than a second duration of a second timer, and the second duration is a duration related to a retransmission of SDT; in response to the first timer having expired and the second timer having not expired, sending a first request to the network device, wherein the first request comprises a request for a second transmission resource; and
receiving second information sent by the network device, wherein the second information indicates the second transmission resource.

12. The terminal device according to claim 11, wherein the second information comprises one or more of the following information: a size of allocatable resources in the network device, scheduled SDT resources, subsequent SDT resources, or SDT retransmission resources, or a size of transmission resources requested by other terminal devices in resource pool.

13. The terminal device according to claim 11, wherein the first transmission resource is a dedicated resource of the terminal device.

14. The terminal device according to claim 11, wherein the first duration of the first timer is determined based on a timing advance (TA) timer.

* * * * *